(12) United States Patent
Chanclon Fernandez et al.

(10) Patent No.: US 12,384,109 B2
(45) Date of Patent: Aug. 12, 2025

(54) ADDITIVE MANUFACTURING TRAY

(71) Applicant: Peridot Print LLC, Palo Alto, CA (US)

(72) Inventors: David Chanclon Fernandez, Barcelona (ES); Jorge Diosdado Borrego, Barcelona (ES); Pablo Antonio Murciego Rodriguez, Barcelona (ES); Berta Carbonell Vilaplana, Barcelona (ES); Kai Halsinger, Vancouver, WA (US)

(73) Assignee: Peridot Print LLC, Palo Alto, CA (US)

( * ) Notice: Subject to any disclaimer, the term of this patent is extended or adjusted under 35 U.S.C. 154(b) by 376 days.

(21) Appl. No.: 17/773,839

(22) PCT Filed: Jan. 30, 2020

(86) PCT No.: PCT/US2020/015949
§ 371 (c)(1),
(2) Date: May 2, 2022

(87) PCT Pub. No.: WO2021/154268
PCT Pub. Date: Aug. 5, 2021

(65) Prior Publication Data
US 2022/0371273 A1 Nov. 24, 2022

(51) Int. Cl.
*B29C 64/245* (2017.01)
*B29C 64/35* (2017.01)
(Continued)

(52) U.S. Cl.
CPC .......... *B29C 64/245* (2017.08); *B29C 64/35* (2017.08); *B33Y 30/00* (2014.12); *B33Y 40/20* (2020.01)

(58) Field of Classification Search
CPC ......... B33Y 40/20; B33Y 30/00; B29C 64/35; B29C 64/245; B29C 64/171; B29C 64/357; B07B 1/28; B22F 10/28; B22F 10/73
See application file for complete search history.

(56) References Cited

U.S. PATENT DOCUMENTS

| | | |
|---|---|---|
| 2008/0241404 A1 | 10/2008 | Allaman et al. |
| 2015/0266157 A1 | 9/2015 | Summers et al. |

(Continued)

FOREIGN PATENT DOCUMENTS

| | | | | |
|---|---|---|---|---|
| DE | 102007010624 A1 | * | 9/2008 | ......... B29C 67/0055 |
| EP | 3427924 A1 | | 1/2019 | |

(Continued)

OTHER PUBLICATIONS

Espacenet Translation of DE102007010624 (Year: 2024).*

*Primary Examiner* — Alison L Hindenlang
*Assistant Examiner* — Erica Hartsell Funk
(74) *Attorney, Agent, or Firm* — Shook, Hardy & Bacon (57) ABSTRACT

An additive manufacturing process which comprises carrying out an additive manufacturing build process to create a build cake. The build cake comprises a build object and non-solidified build material and the build object is built in a build location within the build cake. The build cake is supported on a tray which comprises a mesh having openings therethrough. The tray also includes an object region and a restraining feature to restrain a build object within the object region. The process comprises performing a decake operation in which non-solidified build material from the build cake passes through the openings of the mesh and the object moves into contact with the tray in the object region so that the object is restrained within the object region of the tray by the restraining feature.

15 Claims, 6 Drawing Sheets

(51) Int. Cl.
*B33Y 30/00* (2015.01)
*B33Y 40/20* (2020.01)

(56) References Cited

U.S. PATENT DOCUMENTS

2017/0072466 A1* 3/2017 Zehavi .................. B33Y 30/00
2018/0141275 A1 5/2018 Patel et al.
2019/0047185 A1 2/2019 Kritchman et al.
2019/0232367 A1 8/2019 Sheinman et al.

FOREIGN PATENT DOCUMENTS

WO WO-2018048604 A1 3/2018
WO WO-2018118032 A1* 6/2018 ............... B08B 5/04

\* cited by examiner

ADDITIVE MANUFACTURING TRAY

Additive manufacturing systems can be used to manufacture three-dimensional (3D) objects. This can be achieved, for example, by forming successive layers of a build material on a build platform and selectively solidifying portions of those layers to build up a 3D object within a build cake. Objects such as product components can be built up in layers within the build cake in an additive manufacturing system in accordance with object descriptions as part of build instructions that are interpreted and applied by a print controller.

In an example additive manufacturing process the object is separated from the build cake in a decaking operation in which the build cake is supported on a tray and non-solidified build material of the build cake is removed from the object.

Examples of the present disclosure will now be described with reference to the accompanying Figures, in which.

Figure 1:
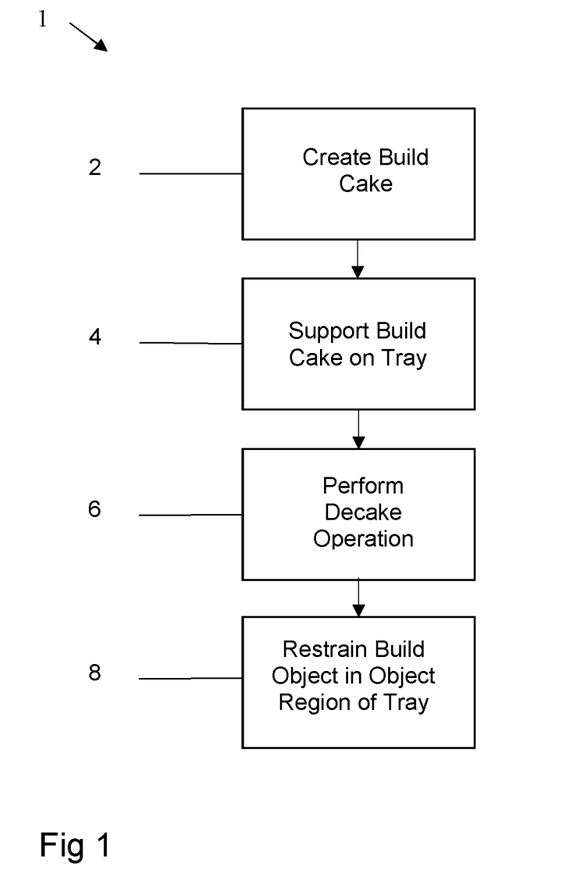
FIG. 1 shows an example of an additive manufacturing process.

FIG. 1 shows an example of an additive manufacturing process 1. The process 1 comprises carrying out an additive manufacturing build process to create 2 a build cake. The build cake created comprises a build object and non-solidified build material. The build object is built in a build location within the build cake.

In this example, the additive manufacturing system that is used in the build process to create the build cake uses build material which is spread over a build platform to form a build layer in a build chamber. Selected portions of the build layer may be solidified, for example by fusing, sintering, melting, binding or otherwise joining the build material using, for example, heat energy applied from an energy source and a fusing agent. The build platform is then lowered by a predetermined amount and a new build layer formed on the previously formed layer and the process repeated. In this way the build object is created within a build cake which is made up of the build object and non-solidified build material.

The build material may comprise any suitable form of build material, for example fibres, granules or powders. The build material can include thermoplastic materials, ceramic material and metallic materials. A store of build material may be provided in a supply vessel and build material may be distributed from the supply vessel to form an intermediate volume of build material from which build material may be spread over a build platform, either directly such as using a roller to spread the intermediate volume, or indirectly by moving some or all of the intermediate volume to another location prior to spreading.

During the additive manufacturing process 1 the build cake is supported 4 on a tray on a build platform. The tray comprises a mesh having openings therethrough. The tray includes an object region and a restraining feature to restrain a build object within the object region. In one example the build cake is created on the tray by the additive manufacturing system. In other examples the build cake is created in a build chamber and is transferred onto the tray either manually or automatically.

The object region of the tray is a region defined on the tray as a region in which a build object can be restrained by the restraining feature. There may be a plurality of object regions defined on the tray so that a build object can be restrained in a plurality of different regions of the tray, or so that a plurality of build objects can each be restrained in an associated object region of the tray. In this example an object location is to restrain a single build object, but in other examples a plurality of build objects can be restrained in a single object region.

Restraining features may comprise any feature which could restrain a build object within an object region of a tray. Suitable restraining features include walls, troughs, projections, pins, and deformable regions into which a build object can sink into, for example pressed by gravity. In one example an object is considered restrained within an object region if there is an enhanced resistance to lateral movement of a build object in a direction across the tray from within the object region to outside object region. In one example the restraining feature of the tray comprises a wall which surrounds an object region to define a compartment within which a build object, or a portion thereof, can be located so that the build object is restrained within the object region. In one example the tray comprises a plurality of compartments. In one example the restraining feature may be configured to provide a cup into which a build object can nest so that the build object can be restrained in predetermined position and possibly also a predetermined orientation. In one example this nesting can be achieved by configuring a cup as a negative of a portion of a build object. The cup may be provided by a continuous surface, or a plurality of surface sections each of which is a negative of a portion of the associated build object.

The additive manufacturing process 1 comprises performing a decake operation 6 in which non-solidified build material from the build cake passes through the openings of the mesh of the tray. The decake operation 6 of this example comprises vibrating the mesh. As a result of the removal of non-solidified build material from the base of the build cake through the mesh the build object moves into contact with the tray.

In this example the openings of the mesh are sized so that the non-solidified build material forms a natural bridge over the opening so that non-solidified build material will not readily flow through the openings without agitation of the mesh, or other energy input. The openings may be any suitable shape. In other examples the tray includes an obstruction member than can be moved between an open configuration in which the build material is able to pass through the openings of the mesh to pass through the tray, the tray also comprising a closed configuration in which the obstruction member occludes openings of the mesh. In such examples the decaking operation comprising moving the tray between a closed configuration and an open configuration.

During the decake operation the build object moves into contact with the tray within the object region of the tray so that the object is restrained 8 within the object region of the tray by the restraining feature.

In one example, the movement of the build object into the object region of the tray is achieved by selecting the build location of the build object with in the cake and the object location on the tray such that, when the build cake is supported on the tray the build object is located vertically above the object location. In this example, during the decake operation, as the non-solidified build material from the build cake is removed through the openings of the mesh of the tray, the build object moves under gravity into the object location and is restrained therein. The removal of the build material may be passive with the build material massing through the mesh under gravity, or the removal may be assisted, for example using suction. In one example the build location of the build object within the build cake is determined based upon the object location of a tray to be used in the process. In other examples the object location of a tray is determined based upon the build location of a build object within a build cake to be created during an additive manufacturing process.

Figure 2:
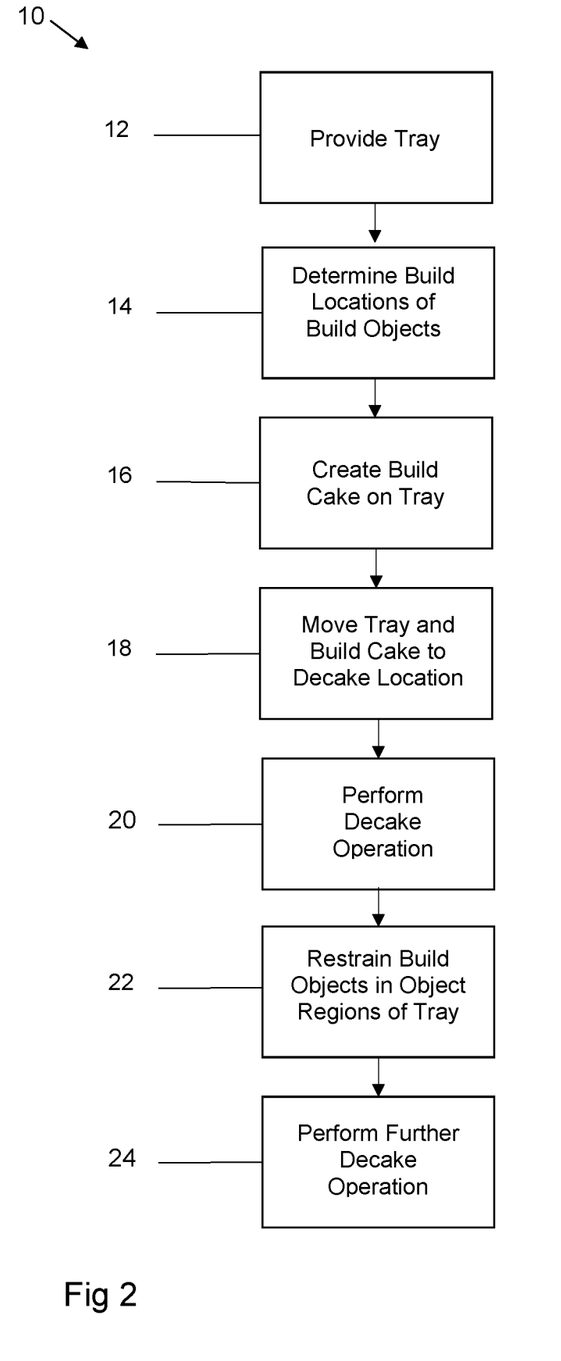
FIG. 2 shows another example of an additive manufacturing process.

FIG. 2 shows an example of an additive manufacturing process 10 in which a plurality of build objects are to be created within a build cake. The process 10 comprises providing 12 a tray. The tray comprises a mesh having openings therethrough. The tray includes a plurality of object regions and restraining features to restrain build objects within the object regions. In one example the tray comprises a mesh removably attached to a frame which supports the mesh.

The process 10 comprises a determining 14 the build locations of the plurality of build objects within the build cake based on the locations of the object locations of the tray.

The process 10 comprises carrying out an additive manufacturing build process to create 16 a build cake so that the build cake created comprises a plurality of build objects at build locations within the build cake and non-solidified build material.

In this example, the additive manufacturing system used in the build process to create the build cake is similar to that described above, but in this example the build cake is created on the tray. In other examples the build cake may be transferred onto the tray after it has been created.

Once the build cake has been created on the tray the tray is used to support the build cake as the tray and build cake are moved to a decake location. In this example the movement of the tray and build cake to the decake location is carried out automatically using automatic handling equipment which engage with handling portions of the frame. The handling portions of the frame include mechanical features to which the automatic handling equipment, such as a robotic arm, can releasably engage so that the automatic handling equipment can move the tray. In other examples the tray and build cake are moved manually, or by other means.

With the tray and build cake in the decake location the additive manufacturing process 10 comprises performing a decake operation 20 in which non-solidified build material from the build cake passes through the openings of the mesh of the tray. In this example the decake operation 20 comprises vibrating the mesh and also directing gas streams towards the build objects to disturb non-solidified material. As a result of the loss of non-solidified build material from the build cake through the mesh the build objects move into contact with the tray.

As the build locations of the build objects in the build cake were determined based on the position of the object locations of the build tray, the build objects move into contact with the tray within the object regions of the tray so that the objects are restrained 22 within the object regions of the tray by the restraining features.

In one example the process 10 further comprises performing a further decake process 24. The further decake process may be more aggressive, for example it may be more energetic, than the initial decake. The more aggressive further decake process may result in a greater likelihood of the build objects moving relative to the tray. In this example the further decake process 24 comprises directing high velocity gas streams, for example air streams, at the build objects to dislodge non-solidified build material which may be trapped in, or retained on, parts of the build objects. This may be combined with vibration of the tray which may assist with dislodging build material from the build object.

The high velocity gas streams may have sufficient energy to move the build objects relative to the mesh of the tray and the restraining features act to restrain the build objects within the object locations into which they came into contact. Restraining build objects in this way may aid traceability of build objects which may assist with quality control. Restraining build objects in this way may also reduce or avoid contacts between build objects and/or between a build object and tray other components during a decake operation which could damage the build objects. This restraining of the build objects within object regions of the tray may reduce or avoid damage to the build objects which may be delicate. Restraining build objects within an object region may also facilitate automation of subsequent processes, for example a pick and place process using a robot since the initial location of the object is known with greater certainty.

Figure 3:
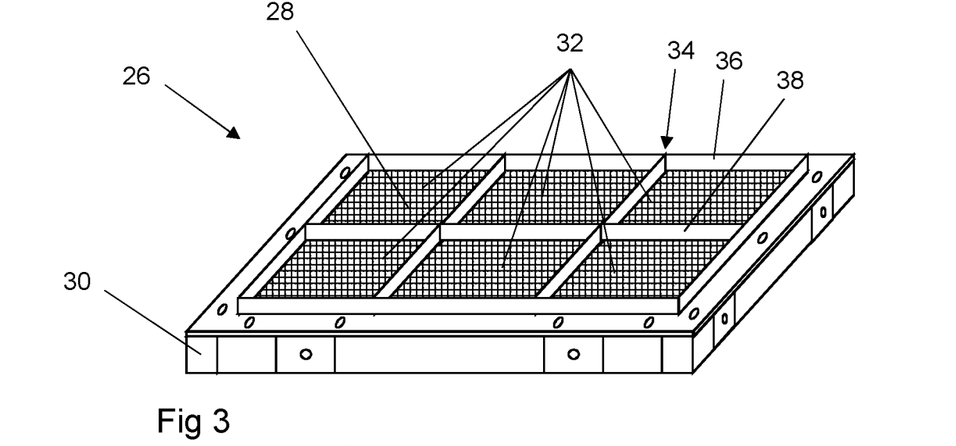
FIG. 3 shows an example of a tray.

FIG. 3 shows an example of a tray 26 to be used in an additive manufacturing process, for example the additive manufacturing process 1 of FIG. 1, of the additive manufacturing process 10 of FIG. 2.

The tray 26 of this example comprises a substantially flat mesh 28 removably attached to a frame 30 which supports the mesh 28. The construction of the tray 26 will be described in more detail with reference to FIG. 3. The tray 26 of this example comprises six object regions 32 and restraining features 34 to restrain a build object within the object regions 32. In this example the restraining features 32 comprise walls, including a peripheral wall 32 extending around the mesh 28 and internal walls 38 which cooperate with the peripheral wall to define the object regions 32 which, in this example are in the form of compartments.

In other examples the restraining features may comprise projections from the mesh, valleys or depressions in the mesh. These may be used separately, or in combination with each other and/or walls.

Six object regions are shown in this example, but in other examples there may be more, or fewer, object regions.

The restraining feature may be made of any suitable material and may comprise a deformable contact portion to reduce the risk of damage to a build object through contact with the restraining feature. In one example the restraining feature comprises walls made from a deformable foam material. In other examples the restraining feature includes a deformable coating layer, for example a rubber, foam, latex or a silicone coating.

The type of restraining features 34, their size and the material from which they are constructed may be selected based upon the build objects being built and the way in which they are to be restrained. In one example the restraining features may comprise pins to contact the build object and restrain it, but still allow air to circulate around the build object.

Figure 4:
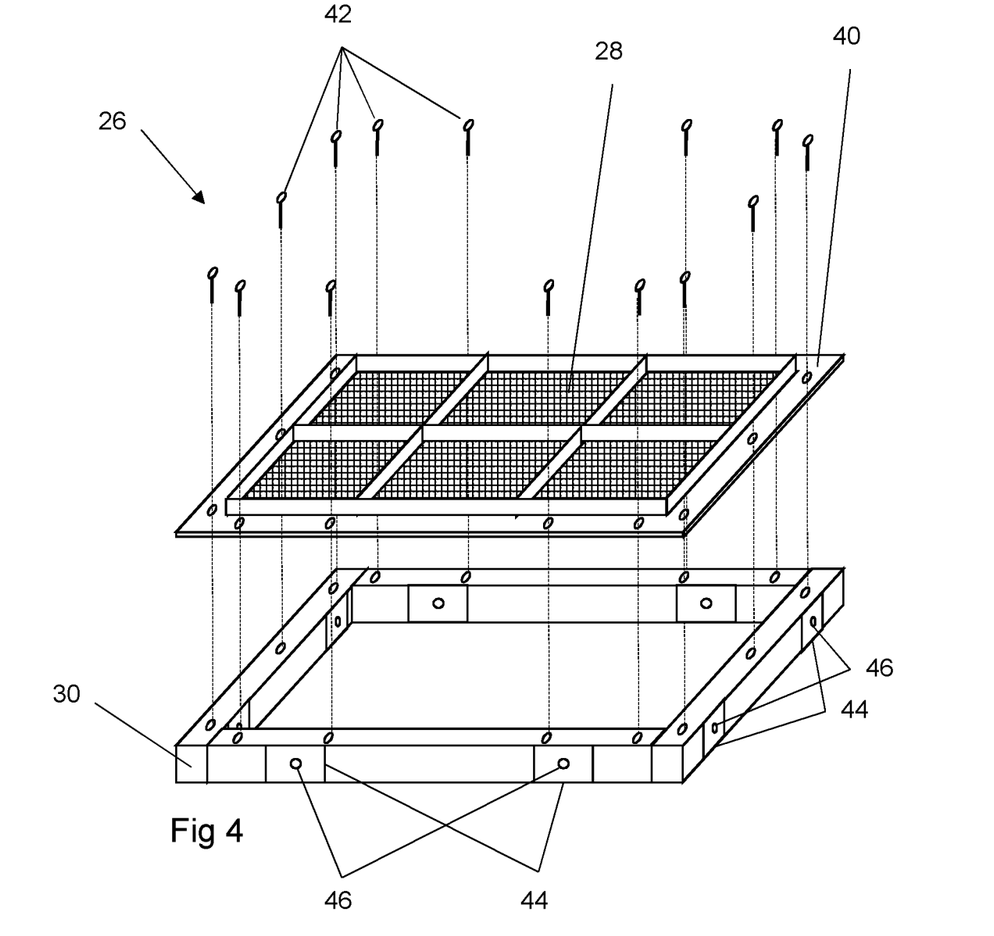
FIG. 4 shows an exploded view of the example of a tray of FIG. 3.

FIG. 4 shows an exploded view of the example of a tray 26 of FIG. 3. In this example the restraining features 34 are carried on the mesh 28 and are secured thereto by welding. In other examples the restraining features may be secured to the mesh, permanently or releasably, by any suitable means, for example adhesives or bonding agents, or fixings such as screws, rivets or clips. In other examples the restraining features may be integrally formed with the mesh. In one example the mesh may be formed in a three-dimensional shape such that there are hills which provide the restraining features which restrain the build objects in the valleys.

In this example the mesh 28 is surrounded by a peripheral edge portion 40 through which fixings, in this example screws 42, are inserted to releasably secure the mesh 28 to the frame 30.

The frame 30 comprises handling portions 44 which include coupling features 46 to which the automatic handling equipment can releasably engage so that automatic handling equipment can move the tray.

Since the mesh 28 is releasably secured to the frame 30 it is possible to remove one mesh 28 and replace it with different mesh which may have different object regions and/or different restraining features which may be selected to be appropriate for a planned build operation. The mesh may be selected from a set of a plurality of meshes having different configurations of object portions and/or restraining features.

FIGS. 5a, 5b, 5c and 5d show schematic cross sections of an example of a sequence of stages of an example of a build cake 48 supported on a tray 126 during a decake operation.

Figure 5A:
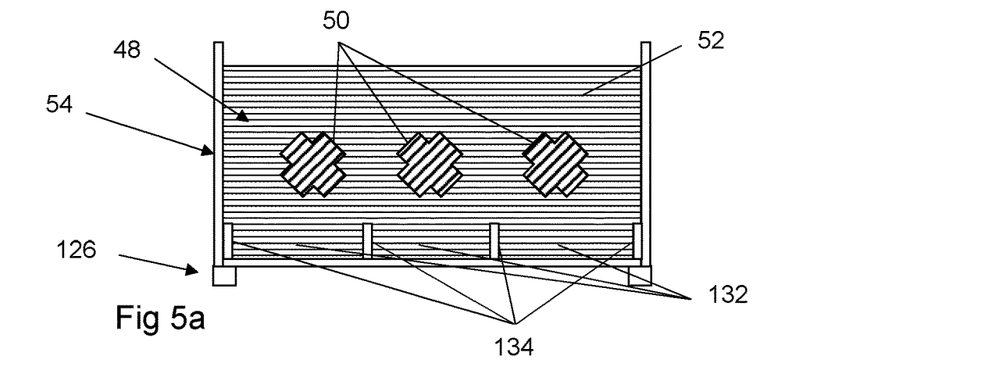
FIGS. 5a, 5b, 5c and 5d show schematic cross sections of an example of a sequence of stages of an example of a build cake supported on a tray during a decake operation.

Referring initially to FIG. 5a which shows an initial state, the build cake 48 comprises build objects 50 and non-solidified build material 52 and is retained at the sides by walls 54, which form part of a box into which the build cake is transferred. The build objects 50 have been built within the build cake at build locations which are located above object regions 132 of the tray 126. The tray 126 includes restraining features 134 adjacent the object regions 132, the restraining features 134 comprising walls forming a compartment which surrounds the object region 132. In this example the assembly of the tray 126, build cake 48 and walls 54 have been automatically moved to a decaking location by an automated handling apparatus which engages with the tray 126, for example with the handling portions 40 of the tray of FIG. 3.

Figure 5B:
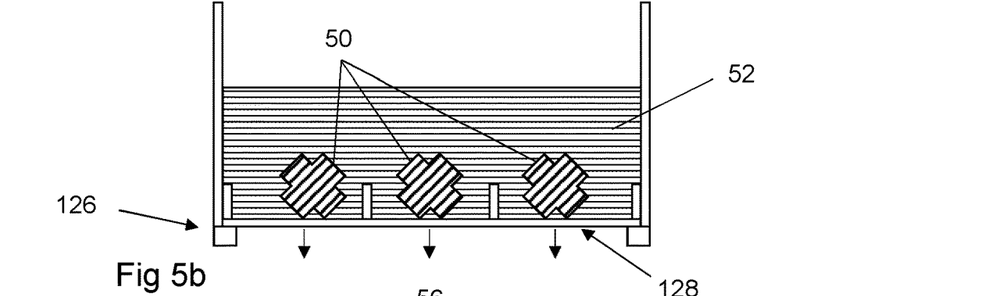

Referring now to FIG. 5b which shows a state during a decaking operation and, in this example, the mesh 128 of the tray 126 is being vibrated so that non-solidified powder is passing though the mesh 128 of the tray 126. As a result of the non-solidified powder passing though the mesh 128 from below the build objects, the build objects 50 have moved into contact with the mesh 128 of the tray 126 within the object regions 132.

Figure 5C:
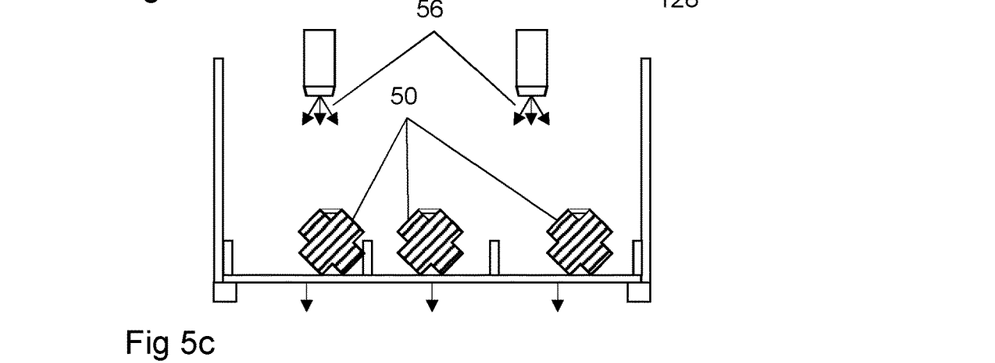

Referring now to FIG. 5c which shows a state during a decaking operation later than that of FIG. 5b. Air streams 56 are being used to assist the decaking operation. However, as a result of the build objects 50 contacting the tray and the air streams 56 impacting the build objects 50, the build objects 50 have moved within the object regions 132. The build objects 50 have been restrained within their respective object regions 132 by the restraining features 134.

Figure 5D:
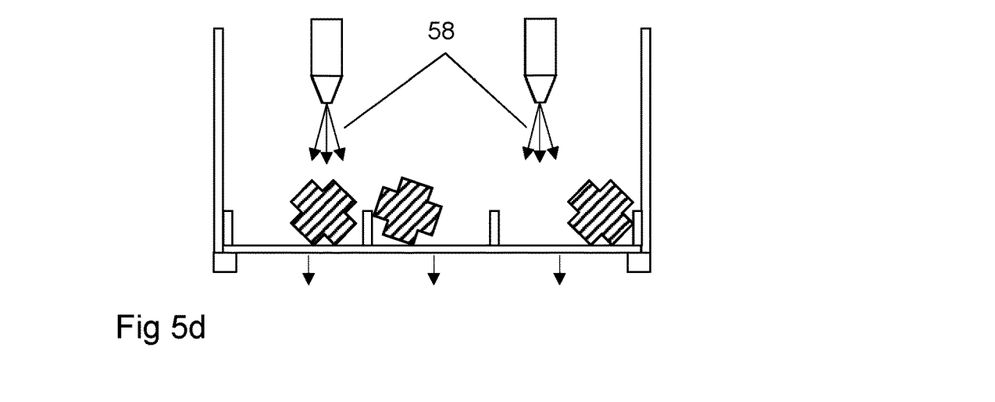

Referring now to FIG. 5d which shows a state during a further decaking operation. High velocity air streams 58 are being used to dislodge non-solidified build material from the build objects 50. As a result of the high velocity air streams 58 the build objects 50 contacting the tray have moved further within the object regions 132. The build objects 50 have been restrained within the object regions 132 by the restraining features 134.

Restraining the build objects 50 within the object regions 132 helps to reduce contact between the build objects which could cause damage to the build objects 50, and also helps to maintain traceability of the build objects 50 during the process.

Figure 6A:
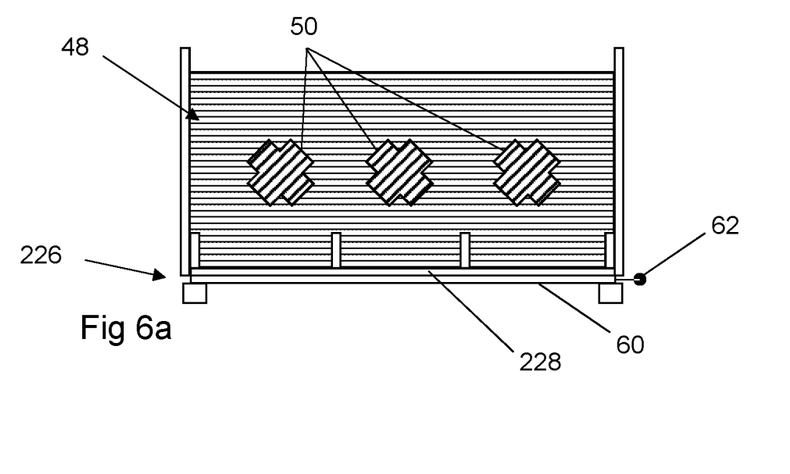
FIGS. 6a and 6b show schematic cross sections of another example of stages of an example of a build cake supported on a tray during a decake operation.
Figure 6B:
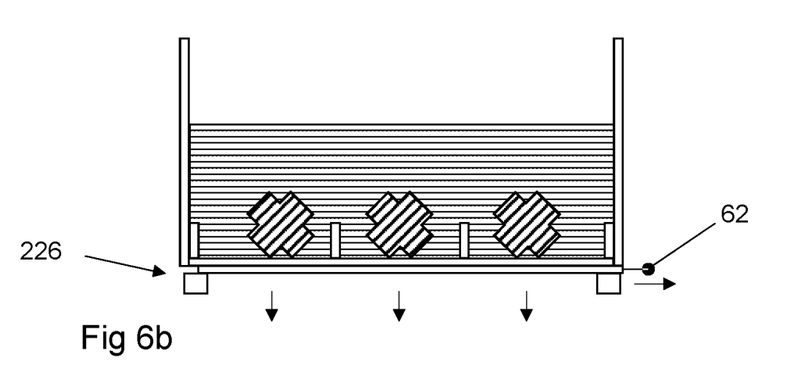

FIGS. 6a and 6b show schematic cross sections of another example of stages of an example of a build cake 48 supported on another example of a tray 226 during a decake operation.

The tray 226 of this example comprises an obstruction member 60 and the tray 226 has an open configuration in which the build material is able to pass through the openings of the mesh 228 to pass through the tray 226. The tray also has a closed configuration in which the obstruction member 60 occludes openings of the mesh 228. As shown in FIG. 6a the tray 226 is in the closed configuration and the obstruction member 60 is occluding the openings of the mesh 228 such that non-solidified build material is prevented from passing through the openings of the mesh 228. This can facilitate moving of the tray 226 with a build cake supported thereon. In this example the obstruction member comprises an obstruction element with openings therethrough and, in the closed position, the openings of the obstruction element are not aligned with the openings of the mesh and so occlude the openings through the mesh.

In other examples the obstruction member may comprise a filter, for example a paper filter, attached under the mesh of the tray to prevent build material from passing through the openings of the mesh. The filter can be removed manually by a user, or automatically by a machine, to allow the build material to pass through the openings of the mesh.

The tray 226 includes a lever 62 with which a user, or an automated, or partly automated, mechanism, can move the tray 226 between the open and closed configurations.

In FIG. 6b the tray 226 has been moved into the open configuration by pulling the lever 62 so that non-solidified build material can pass through the openings of the mesh 228. Thus, the decaking operation comprises moving the tray between a closed configuration to an open configuration. In this example the obstruction element of the obstruction member has been moved so that the openings of the obstruction element are aligned with the openings of the mesh and so build material can pass through the mesh. In some embodiments the degree of alignment between the openings of the obstruction element and the mesh can be varied to alter the amount by which the openings of the mesh are occluded by the obstruction member as this can vary the rate at which build material can pass through the mesh.

Figure 7:
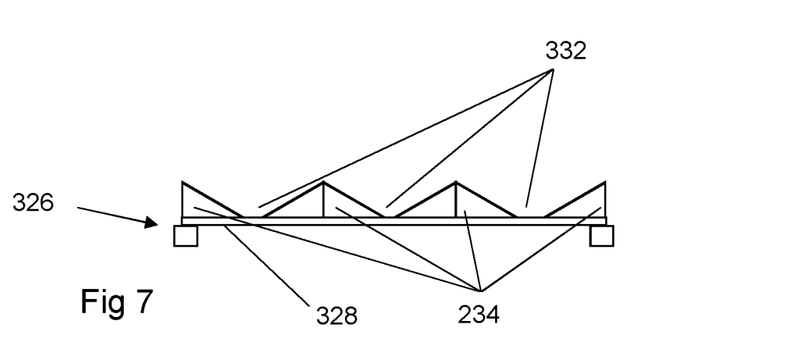
FIG. 7 shows an example of a tray comprising troughs.

FIG. 7 shows another example of a tray 326 to be used in an additive manufacturing process, for example the additive manufacturing process 1 of FIG. 1, of the additive manufacturing process 10 of FIG. 2.

The tray 326 comprises restraining features 234 which comprise sloping surfaces along which a build object moving towards the mesh 328 of the tray 326 under gravity would tend to move so that the build object is directed towards an object region 332. In some examples the sloping surfaces may be continuous and may surround an object region forming a compartment.

Figure 8:
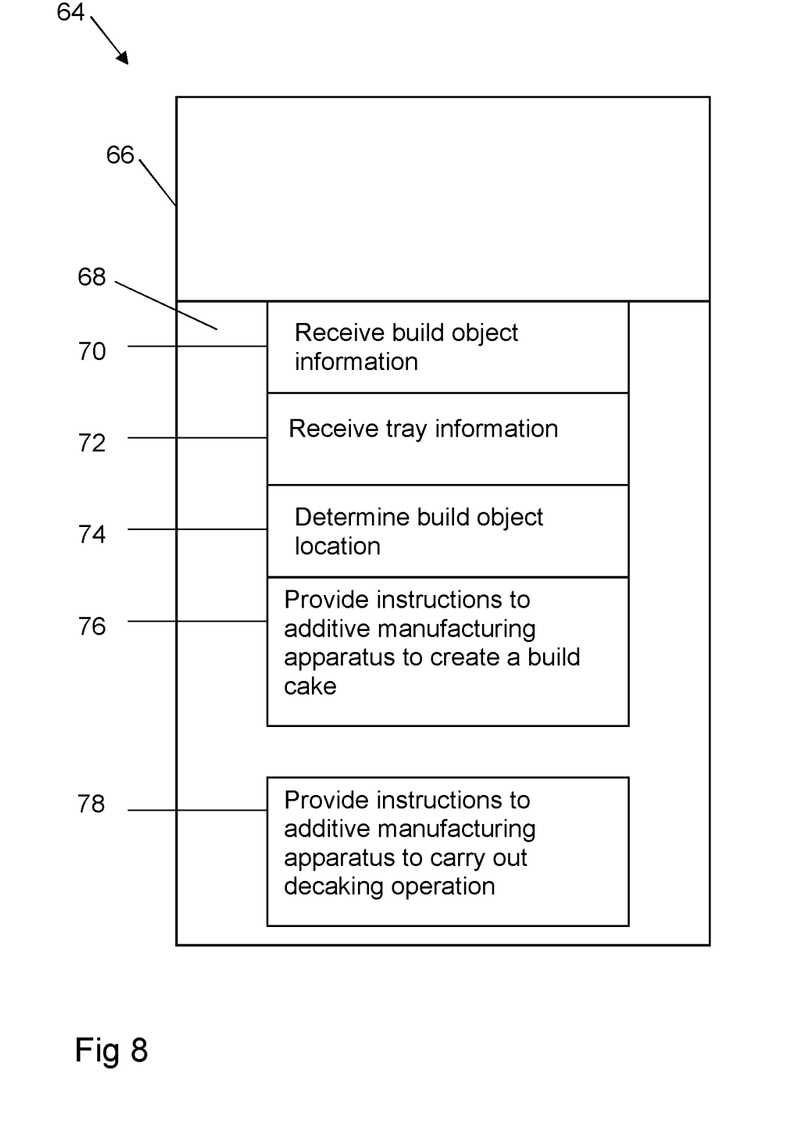
FIG. 8 shows an example of a schematic diagram of an example of a controller.

FIG. 8 shows a schematic diagram of a controller 64. In this example the controller 64 comprises a non-transitory computer-readable storage medium 66 comprising instructions 68 executable by a processor. The computer-readable storage medium 68 comprising:

Instructions 70 receive build object information which comprises information relating to a build object to be built within a build cake created during an additive manufacturing process, for example the additive manufacturing process 1 of FIG. 1 or the additive manufacturing process 10 of FIG. 2.

Instructions 72 to receive tray information which comprises information relating to a tray to be used to support the build cake during a decake process of the additive manufacturing process. The tray comprises a mesh having openings therethrough. The tray further comprising an object region and a restraining feature to restrain a build object within the object region.

Instructions 74 determine, based upon the build object information and the tray information, a build location of the build object within a build cake so that, during the decake operation of the additive manufacturing process, in which non-solidified build material from the build cake passes through the openings of the mesh, the object will move into contact with the tray in the object region so that the object is restrained within the object region of the tray by the restraining feature.

Instructions 76 to provide instructions to an additive manufacturing apparatus to carry out an additive manufacturing process using the tray in which a build cake is created with the build object in the determined build location.

As set out above, there may be a plurality of build objects and the tray may include a plurality of object regions.

The computer-readable storage medium 68 also optionally comprises instructions 78 to provide instructions to an additive manufacturing apparatus to support the build cake on the tray and carry out a decaking operation in which non-solidified build material from the build cake passes through the openings of the mesh.

The invention claimed is:

1. An additive manufacturing process comprising:
   carrying out an additive manufacturing build process to create a build cake, the build cake comprising a build object and non-solidified build material, the build object being built in a build location within the build cake;
   supporting the build cake on a tray, the tray comprising a mesh having openings therethrough and a plurality of object regions, each object region of the plurality of object regions comprising a restraining feature to restrain a build object within each object region of the plurality of object regions, wherein the restraining feature comprises a dividing wall around each object region;
   performing a decake operation in which non-solidified build material from the build cake passes through the openings of the mesh and the object moves into contact with the tray in the object region so that the object is restrained within the object region of the tray by the restraining feature.

2. An additive manufacturing process as claimed in claim 1, in which the build location of the object is determined based upon the position of the object region of the tray within which the object is to make contact with the tray.

3. An additive manufacturing process as claimed in claim 1, in which the build cake comprises a plurality of build objects, each build object being at a different build location within the build cake, and the object region of the tray receives a set of the plurality of build objects during the decake operation and the set of the plurality of build objects is restrained within the object region of the tray by the restraining feature.

4. An additive manufacturing process as claimed in claim 3, in which the tray comprises a plurality of object regions, each object region comprising a restraining feature to restrain a build object within the object region, and in which each object region of the tray receives a set of the plurality of build objects during the decake operation, and each set of the plurality of build objects is restrained by the restraining feature within the object region of the tray within which it was received.

5. An additive manufacturing process as claimed in claim 1, the wherein the dividing wall defines a compartment into which the build object moves during the decake operation.

6. An additive manufacturing process as claimed in claim 5, in which the process comprises performing a further decake process when the build object is restrained within the object region of the tray by the restraining feature.

7. An additive manufacturing process as claimed in claim 1, in which the cake is created on the tray during the additive manufacturing build process.

8. An additive manufacturing process as claimed in claim 7, in which the build process is carried out at a build location and the tray is moved to a decaking location prior to the decaking operation.

9. An additive manufacturing process as claimed in claim 8, in which the tray is automatically moved to a decaking location prior to the decaking operation.

10. An additive manufacturing process as claimed in claim 1, in which the object region of the tray is selected, and the restraining feature configured, based upon the position of the build location of the build object within the build cake.

11. An additive manufacturing process as claimed in claim 1, in which the tray comprises an obstruction member and the tray has an open configuration in which the build material is able to pass through the openings of the mesh to pass through the tray, the tray also comprising a closed configuration in which the obstruction member occludes openings of the mesh, the decaking operation comprising moving the tray between a closed configuration and an open configuration.

12. A tray to support a build cake comprising a build object and non-solidified build material during an additive manufacturing build process, the tray comprising a mesh having openings therethrough and a plurality of object regions, each object region of the plurality of object regions comprising a restraining feature to restrain a build object within each object region of the plurality of object regions, wherein the restraining feature comprises a dividing wall around each object region.

13. A non-transitory machine-readable storage medium comprising instructions executable by a processor, the machine-readable storage medium comprising instructions to:
   receive build object information, the build object information comprising information relating to a build object to be built within a build cake created during an additive manufacturing process;
   receive tray information, the tray information comprising information relating to a tray to be used to support the build cake during a decake process of the additive manufacturing process, the tray comprising a mesh having openings therethrough and an object region of a plurality of object regions and a restraining feature to restrain a build object within each object region of the plurality of object regions, wherein the restraining feature comprises a dividing wall around each object region;

determine, based upon the build object information and the tray information, a build location of the build object within a build cake so that, during the decake operation of the additive manufacturing process, in which non-solidified build material from the build cake passes through the openings of the mesh, the object will move into contact with the tray in the object region so that the object is restrained within the object region of the tray by the restraining feature; and provide instructions to an additive manufacturing apparatus to carry out an additive manufacturing process using the tray in which a build cake is created with the build object in the determined build location.

14. A non-transitory machine-readable storage medium as claimed in claim 13, in which:

the build object information comprises information relating to a plurality of build objects to be built within a build cake created during an additive manufacturing process;

the tray information comprises information relating to a tray including a plurality of object regions and restraining features to restrain a build object within each object region;

the machine-readable storage medium comprising instructions to:

determine, based upon the build object information and the tray information, build locations of the build objects within a build cake so that, during a decake operation of the additive manufacturing process, in which non-solidified build material from the build cake passes through the openings of the mesh, each build object will move into contact with the tray in an object region so that each object is restrained within an object region of the tray by the restraining features; and provide instructions to an additive manufacturing apparatus to carry out an additive manufacturing process using the tray in which a build cake is created with the build objects in the determined build locations.

15. A non-transitory machine-readable storage medium as claimed in claim 13, in which the machine-readable storage medium comprises instructions to:

provide instructions to an additive manufacturing apparatus to support the build cake on the tray and carry out a decaking operation in which non-solidified build material from the build cake passes through the openings of the mesh.

\* \* \* \* \*